United States Patent
Schneider et al.

(10) Patent No.: US 8,522,198 B2
(45) Date of Patent: Aug. 27, 2013

(54) MODEL-OPERATIVE PATTERN REPRESENTATION HARVESTING USING AN AUTOMATED EXEMPLAR-DIRECTED APPROACH

(75) Inventors: Scott E. Schneider, Rolesville, NC (US); Jason M. Smith, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 12/613,492

(22) Filed: Nov. 5, 2009

(65) Prior Publication Data

US 2011/0107296 A1     May 5, 2011

(51) Int. Cl.
*G06F 9/44* (2006.01)
*G06K 9/46* (2006.01)

(52) U.S. Cl.
USPC .......................................... 717/106; 382/190

(58) Field of Classification Search
None
See application file for complete search history.

(56) References Cited

U.S. PATENT DOCUMENTS

| 6,324,541 | B1 | 11/2001 | de l'Etraz et al. |
|---|---|---|---|
| 6,519,571 | B1 | 2/2003 | Guheen et al. |
| 2003/0204503 | A1 | 10/2003 | Hammer et al. |
| 2005/0166193 | A1 | 7/2005 | Smith et al. |
| 2007/0011652 | A1 | 1/2007 | Schneider |
| 2007/0043992 | A1* | 2/2007 | Stevenson et al. ............ 714/732 |
| 2007/0136264 | A1* | 6/2007 | Tran .................................. 707/4 |
| 2010/0061641 | A1* | 3/2010 | Schneider ..................... 382/224 |
| 2011/0007971 | A1* | 1/2011 | Karkkainen .................. 382/190 |
| 2012/0023477 | A1* | 1/2012 | Stevenson et al. ............ 717/105 |

OTHER PUBLICATIONS

Schneider, Scott E. and Lexvold, Randy, "Ephiphanies of patterns! A hands-on survey of pattern-related automation technologies", IBM Corporation, presented at EclipseCon 2008, Mar. 17-20, 2008, Santa Clara, CA, pp. 1-35.
Scott E. Schneider, U.S. Appl. No. 12/25,692, filed Sep. 5, 2008, Office Action, Jul. 19, 2012, 17 pages.
Franklin, Steven, "Customizing and Automating Rational XDE Developer—Java Platform Edition", Feb. 2004. 20 pages.
Johnson, Ralph, "Frameworks = (Components + Patterns)", Oct. 1997. Communications of the ACM; vol. 40, No. 10. pp. 39-42.
Scott E. Schneider, U.S. Appl. No. 12/205,692, filed Sep. 5, 2008, Office Action, Jan. 31, 2013, 18 pages.

* cited by examiner

*Primary Examiner* — Hyun Nam
(74) *Attorney, Agent, or Firm* — Marcia L. Doubet

(57) ABSTRACT

Pattern harvesting is disclosed, using an automated exemplar-directed approach to harvest patterns from a model-operative pattern representation. A domain is identified, and existing pattern occurrences are detected therein in an automated manner. The detected pattern occurrences are used for creating a new pattern specification.

11 Claims, 22 Drawing Sheets

FIG. 4
State Pattern Codification
400

*401* library design;

*410* ⎡ use object.concretization;
     ⎢ use object.delegation;
     ⎣ use design.singleton;

*420* pattern state composites delegation, concretization, singleton {
   *421*         *422*            *423*         *424*

*430* ⎧ structure {
     ⎪   *440* ⎡ roles:
     ⎪          ⎣   context?, state, concrete-state+;
     ⎪              *441*  *442*   *443*
     ⎪   *450* ⎡ relations:
     ⎪          ⎢   delegates-to(context, state),
     ⎨          ⎣   abstracts(concrete-state+, state);
     ⎪ }
     ⎪
     ⎪ *460* behavior {
     ⎪   constraints:
     ⎪   *470* ⎡ delegates(context, state);   *471*
     ⎪          ⎢ concretizes(concrete-state, state);
     ⎩          ⎣ concrete-state = singleton?;
       }
   }

State Composition

*600*

FIG. 7
Barbell Pattern Codification
700

701 library example;

710 {
use uml.class;
use uml.association;
use lang.inequality;
}

720 pattern barbell composites class, association, inequality { — 721, 722, 723, 724

730 structure {
740 roles:
left-bell, right-bell;
750 relations:
bar(left-bell, right-bell);
}

760 behavior {
constraints:
770 left-bell, right-bell = class; 771
not-equals(left-bell, right-bell); 772
associates(left-bell, right-bell); 773
}

}

Barbell Pattern Composition

FIG. 9
Class Pattern

900

```
library uml;
         921
920  native pattern class {
         structure {
940         roles: x;
950         properties: x = class;
         }
     behavior {
970     operations:
            when *invoke java:com.ibm.prose.content.uml.Class$;
         971      972                                      974
                                                     973
     }
}
```

930 (brace for structure block) — 960 (brace for behavior block)

FIG. 10
Class Pattern (Java behavior)
1000

```
package com.ibm.prose.content.uml;

import com.ibm.prose.common.Boolean;
import com.ibm.prose.model.Occurrence;
import com.ibm.prose.model.utils.ModelUtil;
import com.ibm.prose.operations.detect.Detectable;

/**
 * Native pattern operation implementations for the class micro-pattern
 *
 * @author Scott E. Schneider (exo9000)
 */
public class Class
    implements Detectable {

/*
     * (non-Javadoc)
     *
     * @see com.ibm.prose.operations.detect.Detectable#detect(Occurrence)
     */
    public Boolean detect(final Occurrence candidate) {
        return Boolean
            .valueOf(ModelUtil.getValue(candidate).getObject() instanceof org.eclipse.uml2.uml.Class);
    }
}
```

FIG. 11
Inequality Pattern
1100

```
library lang;
1120 native pattern inequality {
      structure {
1140    roles: x, y;
1150    relations: not-equals(x, y);
      }
1130
1160 behavior {
1170   operations:
         when * invoke java:com.ibm.prose.content.lang.Inequality$;
                1171      1172        1173                    1174
      }
}
```

FIG. 14
Overlapping-Barbell Pattern Codification
1400

*1401* library example;

*1410* use lang.inequality;

*1420* pattern overlapping-barbell composites barbell, inequality {    *1421*   *1423*   *1424* structure {
      *1440* roles:
          left-bell, middle-bell, right-bell;
      *1450* relations:
          overlaps(left-bell, middle-bell, right-bell);
    }    *1430* behavior {
      constraints:
        *1470* bar(left-bell, middle-bell);   *1471*
        bar(middle-bell, right-bell);   *1472*
        not-equals(left-bell, right-bell);   *1473*
    }    *1460*
}

```
/**
 * This sample creates two patterns, one string pattern and one pair pattern
 * that composites the string pattern, all in the same library.
 */
public final void testConstructAndSave() {

// Initialize prose model package
    ModelPackageImpl.init();

// Create library, pair pattern, roles and relation
    final Extent extent = ModelFactory.eINSTANCE.createExtent();
    final Library testLibrary = ModelFactory.eINSTANCE.createLibrary();
    extent.getLibrary().add(testLibrary);
    this.setName(testLibrary, "test");
    final Pattern pairPattern = ModelFactory.eINSTANCE.createPattern();
    this.setName(pairPattern, "pair");
    testLibrary.getPattern().add(pairPattern);
    final Role leftRole = ModelFactory.eINSTANCE.createRole();
    this.setName(leftRole, "left");
    final Role rightRole = ModelFactory.eINSTANCE.createRole();
    this.setName(rightRole, "right");
    pairPattern.getStructure().add(leftRole);
    pairPattern.getStructure().add(rightRole);
    final Relation pairsRelation = ModelFactory.eINSTANCE.createRelation();
    this.setName(pairsRelation, "pairs");

// Create predicate left role
    final EList<PredicateRole> pairedRoles = pairsRelation.getPredicateRole();
    final PredicateRole predicateLeftRole = ModelFactory.eINSTANCE.createPredicateRole();
    predicateLeftRole.setPredicate(pairsRelation);
    pairsRelation.getPredicateRole().add(predicateLeftRole);
    predicateLeftRole.setRole(leftRole);
    pairedRoles.add(predicateLeftRole);
```

FIG. 16A (cont'd)

```
// Create predicate right role
final PredicateRole predicateRightRole = ModelFactory.eINSTANCE.createPredicateRole();
predicateRightRole.setPredicate(pairsRelation);
pairsRelation.getPredicateRole().add(predicateRightRole);
predicateRightRole.setRole(rightRole);
pairedRoles.add(predicateRightRole);
pairPattern.getStructure().add(pairsRelation);

// Create string pattern in same library with property string
final Pattern stringPattern = ModelFactory.eINSTANCE.createPattern();
this.setName(stringPattern, "string");
testLibrary.getPattern().add(stringPattern);
final Role stringRole = ModelFactory.eINSTANCE.createRole();
this.setName(stringRole, "string");
stringPattern.getStructure().add(stringRole);
final Property stringProperty = ModelFactory.eINSTANCE.createProperty();
this.setName(stringProperty, "string");
final EList<PredicateRole> stringRoles = stringProperty.getPredicateRole();
final PredicateRole predicateStringRole = ModelFactory.eINSTANCE.createPredicateRole();
predicateStringRole.setPredicate(stringProperty);
predicateStringRole.setRole(stringRole);
stringRoles.add(predicateStringRole);
stringPattern.getStructure().add(stringProperty);

// Create simple console output operation for string pattern
final Fragment codeFragment = ModelFactory.eINSTANCE.createFragment();
stringPattern.getBehavior().add(codeFragment);
codeFragment.setCode("System.out.println($string).");
final Operation operation = ModelFactory.eINSTANCE.createOperation();
codeFragment.setOperation(operation);
```

FIG. 16A (cont'd)

```
// Create first string composition constraint
final Composition leftConstraint = ModelFactory.eINSTANCE.createComposition();
pairPattern.getBehavior().add(leftConstraint);
final EList<Variable> leftVariables = leftConstraint.getVariable();
final Variable leftVariable = ModelFactory.eINSTANCE.createVariable();
leftVariables.add(leftVariable);
final Occurrence leftOccurrence = ModelFactory.eINSTANCE.createOccurrence();
leftOccurrence.setPattern(stringPattern);
leftOccurrence.getParticipant().add(leftVariable);
leftVariable.setPredicateRole(predicateStringRole);
leftVariable.setSubstitute(predicateLeftRole);

// Create second string composition constraint
final Composition rightConstraint = ModelFactory.eINSTANCE.createComposition();
pairPattern.getBehavior().add(rightConstraint);
final EList<Variable> rightVariables = rightConstraint.getVariable();
final Variable rightVariable = ModelFactory.eINSTANCE.createVariable();
rightVariables.add(rightVariable);
final Occurrence rightOccurrence = ModelFactory.eINSTANCE.createOccurrence();
rightOccurrence.setPattern(stringPattern);
rightOccurrence.getParticipant().add(rightVariable);
rightVariable.setPredicateRole(predicateStringRole);
rightVariable.setSubstitute(predicateRightRole);

// Save the model
Registry.INSTANCE.getExtensionToFactoryMap().put("extent", new XMIResourceFactoryImpl());
final Resource resource = new XMIResourceFactoryImpl().createResource(URI.createFileURI("models/test.extent"));
resource.getContents().add(extent);
try {
    resource.save(Collections.emptyMap());
} catch (final IOException e) {
    e.printStackTrace();
}
}
```

```
library test pattern pair composites string {
    structure {
        roles: left, right;
        relations: pairs(left, right);
    }
    behavior {
        constraints: left, right = string;
    }
} local pattern string {
    structure {
        roles: string;
        properties: string = string;
    }
    behavior {
        operations:
            when * invoke java.fragment {
                System.out.println($string);
            }
    }
}
```

MODEL-OPERATIVE PATTERN REPRESENTATION HARVESTING USING AN AUTOMATED EXEMPLAR-DIRECTED APPROACH

CROSS-REFERENCE TO RELATED APPLICATION

The present patent application is related to commonly-assigned and co-pending patent application Ser. No. 12/205,692 (filed Sep. 5, 2008), titled "MODEL-OPERATIVE PATTERN REPRESENTATION AND OPERATIONAL ENABLEMENT USING DECLARATIVE COMPONENTIAL-DRIVEN DOMAIN-SPECIFIC PROGRAMMING LANGUAGE", the disclosure of which is hereby incorporated herein by reference.

RESERVATION OF COPYRIGHT

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

BACKGROUND OF THE INVENTION

The present invention relates to computer programming, and deals more particularly with automated harvesting of patterns.

In the general sense, a pattern is a recurring abstraction that specifies a configuration of objects and relationships among them. The relationships may be of various types, including sequential, spatial, temporal, logical, mathematical, and so forth. A pattern can be said to represent a common solution to a common problem in a given context.

In the context of software development, patterns are used extensively to solve small-scale as well as large-scale problems in the design, modeling, implementation, deployment, and/or maintenance of software systems. The application of a pattern to, or within, a software system causes the system to be structured, and to behave, in certain ways as dictated by or consistent with the pattern.

BRIEF SUMMARY OF THE INVENTION

The present invention is directed to model-operative pattern representation harvesting. In one embodiment, this comprises: detecting, from an identified boundary of a model containing at least one identified exemplar, all existing pattern occurrences; determining, from the detected existing pattern occurrences, all overlapping pattern occurrences; defining, for each determined overlapping pattern occurrence, a shared role in a new pattern; and generating a pattern codification for the new pattern. The generated pattern codification may be validated and/or stored on a storage medium. A textual specification generated as the codification of the new pattern may be customized, using (for example) an editor program. Redundant ones of the detected pattern occurrences are preferably removed before determining the overlapping occurrences.

In one aspect, the generating further comprises: determining roles of the new pattern; determining constraints of the new pattern; determining relationships between the roles of the new pattern; codifying the roles and the relationships in a structure section of the generated pattern codification; and codifying the constraints in a behavior section of the generated pattern codification. The generated pattern codification for the new pattern may be stored in a pattern library that stores pattern codifications for a plurality of patterns, and may be used as a component for compositing a different pattern.

Embodiments of these and other aspects of the present invention may be provided as method, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 4 provides sample syntax that may be used to codify the sample pattern in FIG. 1;

FIGS. 6 and 7 provide another sample pattern and sample syntax that may be used to codify this sample pattern, respectively;

FIGS. 9 and 11 provide sample syntax that may be used to codify atomic patterns from which the sample pattern illustrated in FIGS. 6-7 is composed;

FIG. 10 provides sample object-oriented programming language code that may be used to implement the atomic pattern in FIG. 9;

FIG. 14 provides sample syntax which may be programmatically generated during harvesting to codify the overlapping-barbell pattern illustrated in FIG. 12;

FIG. 16A illustrates an example of object-oriented code that programmatically constructs two patterns, manipulating a pattern at the meta-model level, and FIG. 16B shows a sample meta-model pattern representation for these same patterns using a declarative pattern specification language;

DETAILED DESCRIPTION OF THE INVENTION

Figure 1:
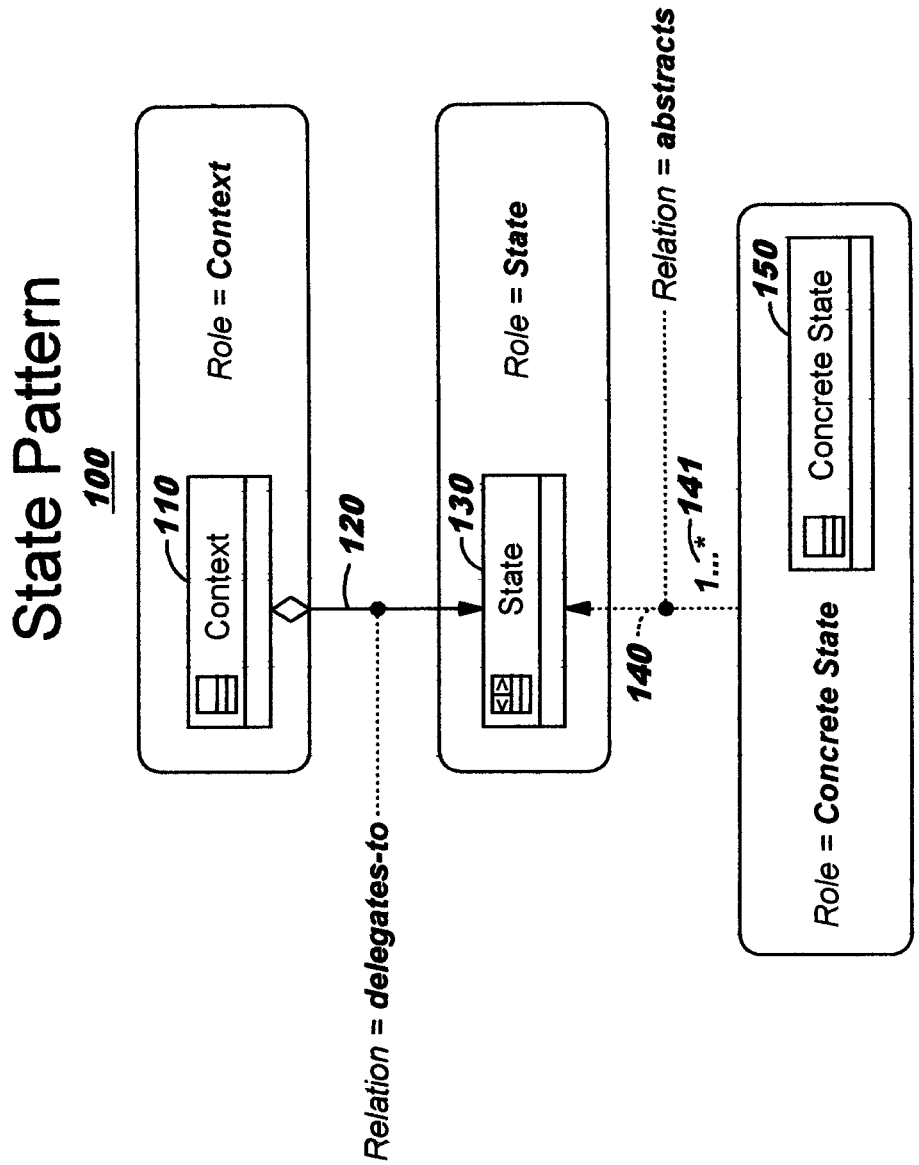
FIGS. 1 and 2 provide a sample pattern and corresponding sample pattern occurrence, respectively.

Many different things may exhibit patterns, including everyday items, models of various types, programming language code, and so forth, and thus in the general sense, patterns may be found anywhere. Java™ code, for example, may exhibit patterns. In a modeling environment, patterns may be exhibited in Unified Modeling Language ("UML") models, data models, and so forth.

A model-operative pattern is a pattern that operates on models or elements in models. For example, an operation may correspond to applying an "observer" design pattern to a particular group of UML model elements, or to detecting a business process pattern in a business model, and so forth. Patterns may be used as components to compose other patterns, and this may be referred to as componential-driven pattern construction.

Embodiments of the present invention are directed toward pattern harvesting, whereby patterns represented in a model are detected in an automated manner and used for creating new patterns. A pattern occurrence may exist in a particular domain even though that occurrence has not been formally codified as a pattern. Techniques disclosed herein enable detecting the pattern and programmatically codifying its definition.

Commonly-assigned and co-pending patent application Ser. No. 12/205,692 (filed Sep. 5, 2008), titled "MODEL-OPERATIVE PATTERN REPRESENTATION AND OPERATIONAL ENABLEMENT USING DECLARATIVE COMPONENTIAL-DRIVEN DOMAIN-SPECIFIC PROGRAMMING LANGUAGE" (hereinafter, "the related application") discloses a declarative, domain-specific language for pattern representation. This language is referred to herein as "Prose", which is an acronym for "pattern reasoning and object-oriented specification environment", and may be considered as leveraging concepts from predicate calculus. This declarative language is based upon a premise that most patterns are defined in terms of other patterns. Stated another way, patterns are usable as components of other patterns. A pattern may therefore be considered a reusable software component.

While patterns offer advantages in a traditional software design cycle, patterns are also general enough to be relevant and valuable to other uses outside this arena. A pattern can be considered as a named, context-sensitive, constrained, composite, parameterized abstraction. By way of review of the related invention, a description of these terms will now be presented. When a pattern is named, the pattern can be referenced for purposes such as reuse. Context-sensitive means that the pattern may be defined with regard to a particular context or area of applicability. Constrained refers to defining a pattern through constraints on the entities (referred to equivalently herein as elements) that make up the pattern. Composite refers to specifying a pattern in terms of other patterns. Parameterized refers to declaring a pattern with regard to variability points. These variability points enable a particular pattern to be adapted and applied in varying domains as parameter values are provided for the variability points. Accordingly, a pattern may be reused in different models. Abstraction refers to hiding implementation details while enabling a pattern to embrace domain-specific concepts.

The term "pattern occurrence", as used herein, refers to an instance of a pattern. A pattern occurrence, or instance, therefore makes concrete (or "concretizes") what was abstract in the pattern itself. As described in the related application, constraints may be completely or partially satisfied in a pattern instance. When a pattern is instantiated, instances are preferably also created for the underlying patterns from which this particular pattern is composed, although alternatively, the instantiation of at least some underlying patterns may be delayed (as discussed in more detail in the related application). Concrete elements are specified in a pattern instance for at least some of the variability points in the pattern. And although the pattern instance includes concrete elements, the abstraction provided by the pattern itself may remain apparent in the instance. A pattern occurrence may therefore be considered as a concretization of the constrained, composite, parameterized abstraction.

Figure 2:
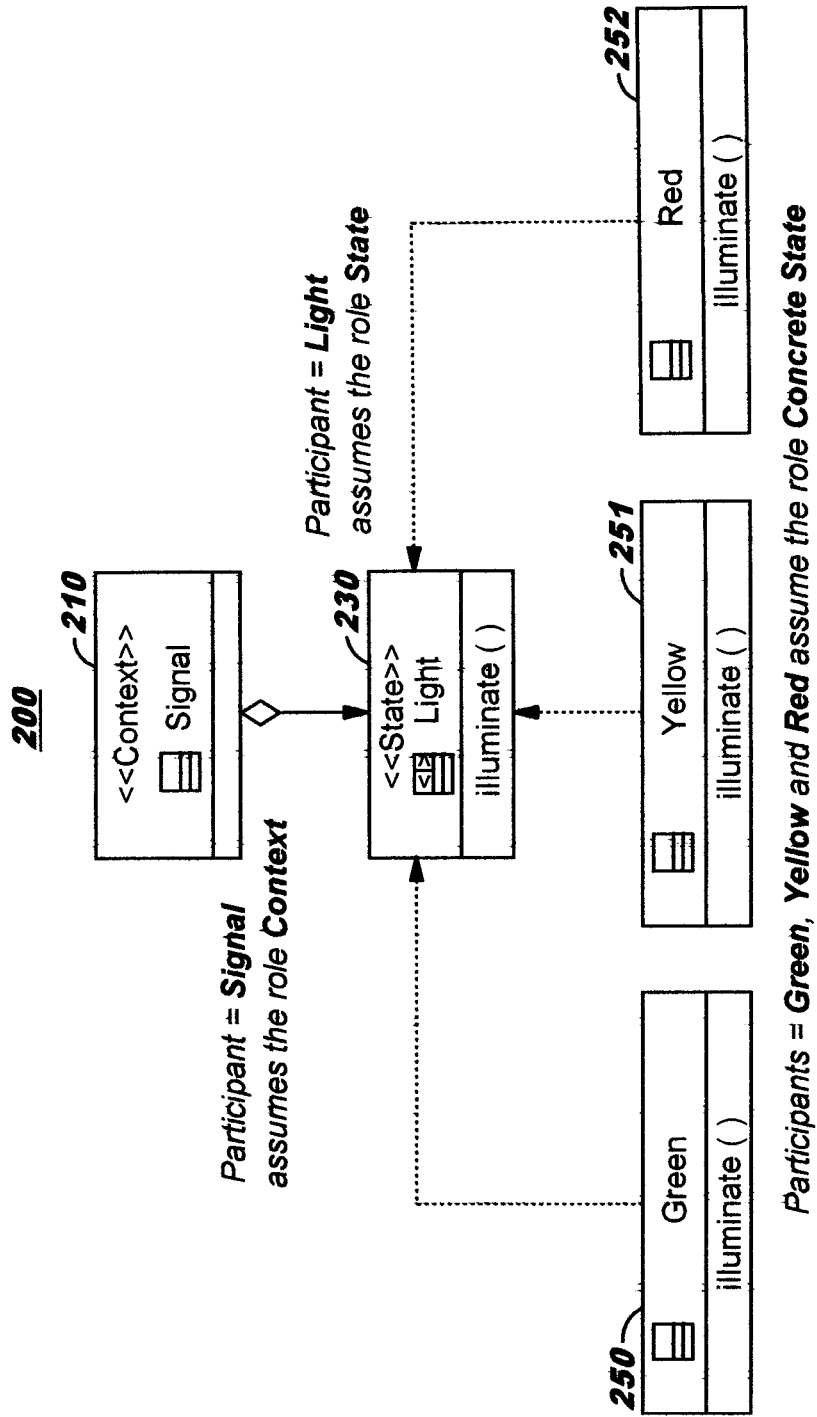

An example is provided in FIGS. 1 and 2 to illustrate the above-discussed concepts. FIG. 1 depicts a pattern referred to herein as the "state" pattern, and FIG. 2 illustrates one sample instance of this state pattern. The state pattern provides an abstraction of real-world entities that have an associated, and variable, state. By way of example, the instance shown in FIG. 2 illustrates a traffic signal and its potential states.

As shown in FIG. 1, the state pattern 100 of this example comprises three roles 110, 130, 150 and two relationships 120, 140. In the general case, the roles and relationships in a pattern provide points of variability for that pattern, and these variability points enable reuse of the pattern. Reuse of a pattern occurs when different participants fulfill, or assume, the roles of that pattern. So, for example, while FIG. 2 illustrates a sample instance where a role in the state pattern is fulfilled (i.e., assumed) by a traffic signal, that role might alternatively be assumed by another entity that has a state, such as a baking oven, thus reusing the state pattern.

FIG. 1 illustrates a first role 110 which indicates that the state pattern 100 operates in a context. A second role 130 indicates a state, which corresponds to the actual state being modeled and which is related to context 110 by a "delegates-to" relationship 120. A third role 150 indicates that the state pattern 100 has a concrete state. This concrete state 150 is related to state 130 by an "abstracts" relationship 140. A cardinality is shown as "1 . . . *" for the abstracts relationship 140; see 141. In other words, state 130 is an abstract role that is related to one or more concrete states 150 by the abstracts relationship 140.

FIG. 2 provides an example occurrence 200 of the state pattern 100, showing how this state pattern 100 may be used to represent the states of a traffic signal. In the sample state pattern occurrence 200, which concretizes the state pattern for the traffic signal scenario, the participants that assume the various roles of the state pattern are as follows: a signal participant (see 210) assumes the context role 110 from FIG. 1; a light participant (see 230) assumes the state role 130; and three different states of the light of a traffic signal (see 250, 251, 252) assume the concrete state role 150. In this example, the participants assuming the concrete state role 150 are identified as "Green" 250, "Yellow" 251, and "Red" 252, thereby indicating that the state of the light for the traffic signal may be green, yellow, or red. Note that the "illuminate( )" syntax specified for each of "Green" 250, "Yellow" 251, and "Red" 252 in FIG. 2 is the name of the operation that all concrete state roles must implement according to the "concretization" pattern (not shown in FIG. 2) that defines the operation name and signature for the sample state pattern. When a particular state of "Green", "Yellow", or "Red" is plugged in and delegated to at run time, the behavior of what it means to be in a certain state for this certain operation will be executed.

Figure 3:
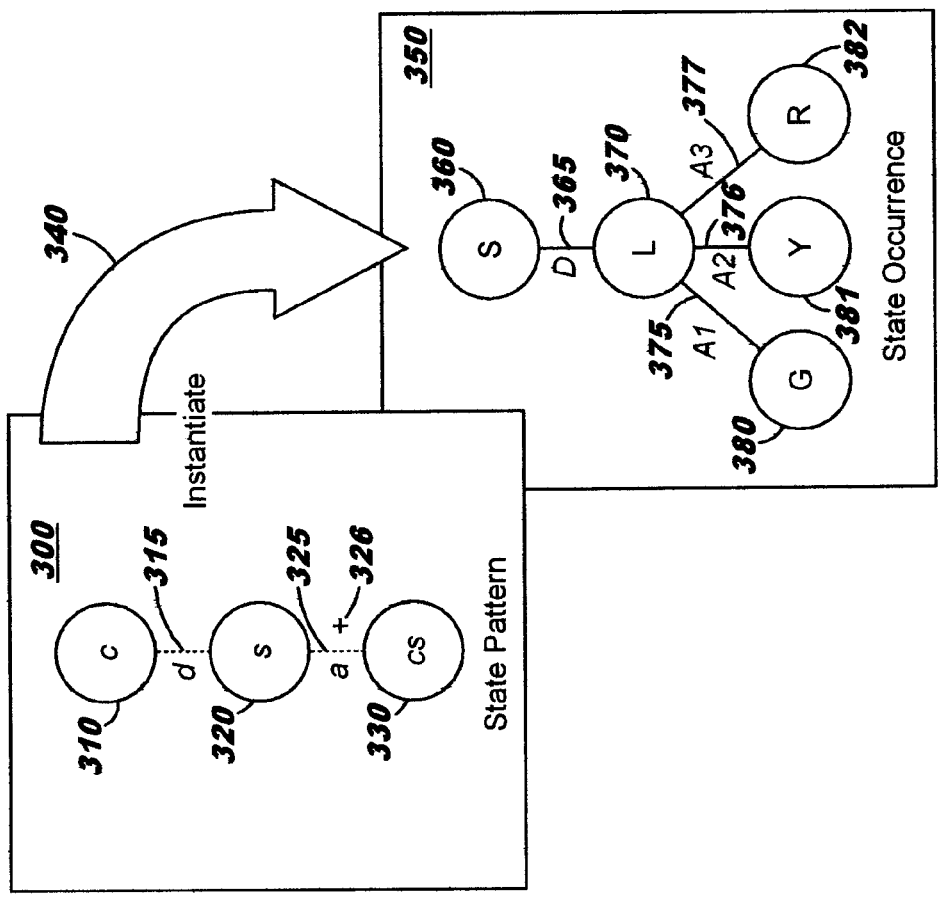
FIG. 3 provides an abstract graph, illustrating how the pattern and pattern occurrence from FIGS. 1 and 2 are related.

Conceptually, a pattern may be represented as an abstract graph where the vertices correspond to roles and the edges correspond to relationships. This is illustrated in FIG. 3 for the state pattern 100 and state occurrence 200, showing the pattern and the occurrence in graph form at 300 and 350, respectively. In graph 300, vertex 310 corresponds to the context role 110 of FIG. 1; vertex 320 corresponds to the state role 130; and vertex 330 corresponds to the concrete state role

150. Graph 300 also shows edge 315, which corresponds to the delegates relationship 120 of FIG. 1, and edge 325, which corresponds to the abstracts relationship 140. (Note also that the cardinality of the abstracts relationship 140 is indicated as 1-to-many by use of a "+" sign 326 in the sample graph 300.) The state pattern corresponding to graph 300 is instantiated as the state occurrence corresponding to graph 350, as indicated by arrow 340. In the graph 350 for the state occurrence, vertex 360 corresponds to the signal participant 210 of FIG. 2; vertex 370 corresponds to the light participant 230; and vertices 380, 381, 382 correspond to the green, yellow, and red participants 250, 251, 252. Edge 365 of graph 350 corresponds to the delegates relationship 120 of FIG. 1, and edges 375, 376, 377 correspond to the abstracts relationship 140.

In the general case, a pattern represented using the Prose language is defined as having three parts. The parts are a context (which may alternatively be optional or omitted), a structure, and behavior. Each of these parts will now be discussed briefly for the general case, and an example showing how the state pattern may be codified using these parts will then be described with reference to FIG. 4.

The context indicates where and when a pattern is applicable. An alternative embodiment may omit the context, or provide for context to be optional, although inclusion of this part is believed to enable an implementation to operate in a more optimal manner (e.g., by narrowing the range of applicability of a pattern). As shown by way of example in FIG. 2, the state pattern 100 is applicable in the traffic signal context 210. However, as will be obvious to the reader, many different entities may be determined to exhibit a state property, in many different contexts. As one example of these other entities, a baking oven may assume the context role 110, and the state role 130 might then be assumed by a heating element, a timer, an oven light, and so forth. The concrete role 150 may then be assumed, for example, by participants identified as "On" and "Off".

The structure is the abstract syntax of a pattern, and may alternatively be referred to as the pattern signature. The structural features for a pattern define pattern roles and relations involving those roles. Referring again to the state pattern example as depicted in FIG. 1, the pattern signature in this example comprises three roles and two relationships.

The behavior is the pattern semantics, and thus specifies what it means for an entity to exhibit the pattern. The behavioral features use the structural features (e.g., the roles and relations) of the pattern for constraining expressions that are defined using structural features from another pattern or patterns.

As disclosed in the related application, the specification of a pattern is provided in a declarative and consistent manner, using a human-readable and machine-processable document that details the defining characteristics of that pattern (as will be discussed with reference to the examples in FIGS. 4 and 7), and the code for execution of specific operational use cases (that is, for executing specific operations) against these patterns, occurrences, and models of interest (e.g., for pattern application, pattern detection, and so forth) is separate from the pattern specification. A benefit of this decoupling approach is that new patterns can be created while leveraging the current operations supported on standard pattern specifications. In addition, new operations can be added and honed, and can then be reused by other existing patterns in the system.

Referring now to FIG. 4, a sample codification 400 of the state pattern is illustrated. (It should be noted that the syntax shown in the example codifications is illustrative but not limiting.) A "library" statement 401 specifies where this pattern codification will be stored (and may be considered as being similar to a package declaration in the Java™ programming language). One or more "use" statements 410 specify where to find other patterns used by this pattern. (These other patterns are discussed in more detail with reference to FIG. 5, below). Note that the "use" statements 410 provide information on where to find the Delegation 422, Concretization 423, and Singleton 424 patterns; however, if a particular pattern is stored in the same library as this State pattern, then the "use" statement is not strictly required at 410 for that pattern.

A "pattern" statement 420 provides a declaration of the pattern, and a name 421 for the pattern is specified therein along with a "composites" attribute that identifies other patterns 422-424 which are used by this pattern. In the general case, the "composites" attribute may name one or more other patterns. For patterns which are not composed of other patterns, the "composites" attribute is preferably replaced by a "native" attribute that precedes the "pattern" keyword in the pattern statement to signify that an atomic pattern is being defined. (See, for example, reference number 921 of FIG. 9.) Atomic patterns are described in more detail below.

A "structure" definition 430 provides the pattern signature and defines the roles and relationships for the pattern, as mentioned earlier. For this example 400, the structure comprises three roles 440 and two relationships 450. These roles 440 and relationships 450 are as described above with reference to FIGS. 1-3. In the illustrated syntax, a "?" follows the "context" role name (see 441), thereby indicating that this role is optional, and a "+" follows the "concrete-state" name (see 443), thereby indicating that one or more participants for this role may exist in an occurrence of this particular pattern 400; by default, absence of a "?" or "+" character after a role name (see 442) indicates that the role will be assumed by a single participant in an occurrence of the pattern. Each of the relationships 120, 140 in the state pattern example is between participants in two different ones of the pattern's roles, and thus each relationship definition specified at 450 includes two parameters within a parameter list that is enclosed in parentheses and in which the parameters are separated by commas (by way of illustration but not of limitation), and each of these parameters corresponds to one of the role names defined at 440.

A "behavior" definition 460 specifies constraints on occurrences of pattern 400. That is, the syntax specified at 470 must be in effect (i.e., must be true) for this pattern to be applied. For example, the "delegates" constraint at 471 indicates that the participant proposed for assuming the context role (see 110 of FIG. 1) must have a delegates-to relationship (see 120) to the participant proposed for assuming the state role (see 130) in order for the state pattern to be applied using these participants.

Note that the sample state pattern codification 400 omits the optional context part. (Similarly, the sample barbell codification 700 provided in FIG. 7, which is discussed below, also omits the context part.)

Codifying pattern implementations using model-driven development tools according to known techniques is typically time-consuming and error-prone. Often, a new pattern representation is created by an end user as a portable pattern that can then be reused by others who wish to reap the benefit of the already-created pattern representation and its corresponding implementation. However, pattern authoring tools provided using known approaches are limited in the degree of automated assistance available to the user before the user must resort to Java language coding in order to fully express the semantics equated to the pattern. That is, while the tool may generate code to represent a skeleton of the pattern implementation, codification of the pattern semantics is left as an exercise for the pattern author. The codification process is often quite difficult and tedious, and may require the pattern author to expend a week's time (or more) in finalizing the definition of the pattern.

Because known solutions are so time-consuming, the cost of codifying a pattern in this manner often outweighs any cost-savings that might be anticipated from using the pattern being constructed. Techniques disclosed herein, by contrast, allow a user to construct portable pattern implementations using a point-and-click approach that initiates automated processing; alternatively, the automated processing may be initiated by another automated process. This automated pattern construction is referred to herein as pattern "harvesting". As disclosed herein, the harvesting operation uses existing pattern occurrences as concrete exemplars, and these are then used to generalize the occurrence back into an abstract pattern with variability points by leveraging the compositional nature of existing Prose pattern representations and a pattern detection process that operates on those existing pattern representations.

Figure 5:
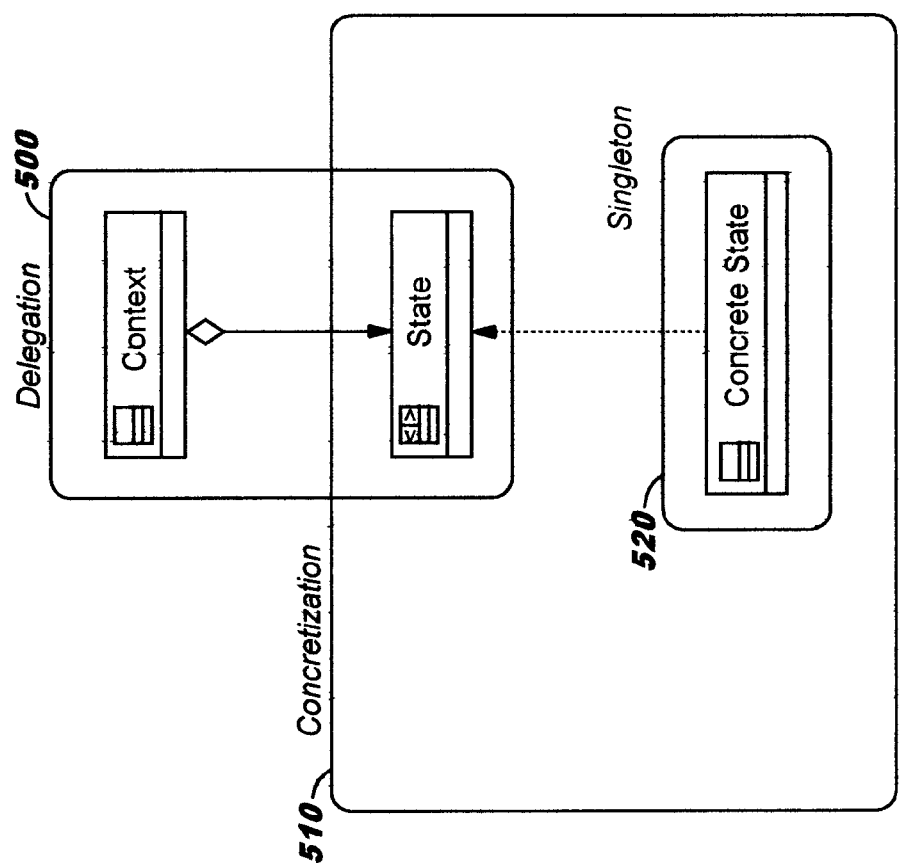
FIG. 5 illustrates a sample pattern composition, with regard to the sample pattern from FIG. 1, showing how one pattern may be composed of other patterns.

FIG. 5 provides an illustration of pattern composition, using the sample state pattern to depict how patterns may be composites which are composed from other patterns. As shown in FIG. 5, the three-role and two-relationship state pattern may be decomposed into (or conversely, may be composed from) a delegation pattern 500, a concretization pattern 510, and a singleton pattern 520. The delegation pattern 500, for example, comprises two roles and a relationship therebetween, where the relationship corresponds to a particular one of the roles delegating to the other. The concretization pattern 510 also comprises two roles and a relationship, and the relationship corresponds to a particular one of the roles providing a concrete instance of the other role. (Note that the concretization in this example may be considered as the inverse of the abstracts relationship 140 from FIG. 1, or stated another way, if a participant "A" abstracts a participant "B", then the participant "B" concretizes the participant "A".) The singleton pattern 520 involves a single role.

Patterns which are composed of other patterns and which may be of interest to an end user (such as a programmer or software designer) as providing interesting and unique semantics for direct use by such end user may be referred to as "macro patterns". On the other hand, some patterns may be of more use as building blocks from which the macro patterns may be composed. For example, these other patterns may be of less interest for direct usage by an end user, while being useful for enabling a pattern processing tool to accomplish its operation. These other "building block" type patterns may be termed as "micro" patterns and "atomic" patterns, where the micro patterns are composed from other patterns and the atomic patterns (sometimes referred to as "elementary patterns") are those patterns which cannot be further decomposed into component patterns. While the declarative approach of the Prose language disclosed in the related application is preferably used for defining patterns that use composition (i.e., micro patterns and macro patterns), the atomic patterns are preferably specified using imperative code from a conventional programming language (and may include programming languages yet to be developed). An example of micro-patterns is the barbell pattern which is discussed in more detail below with reference to FIGS. 6-8. Examples of atomic patterns include equality, inequality, class, and association, and these atomic patterns are also discussed in more detail below with regard to the barbell pattern.

Figure 6:
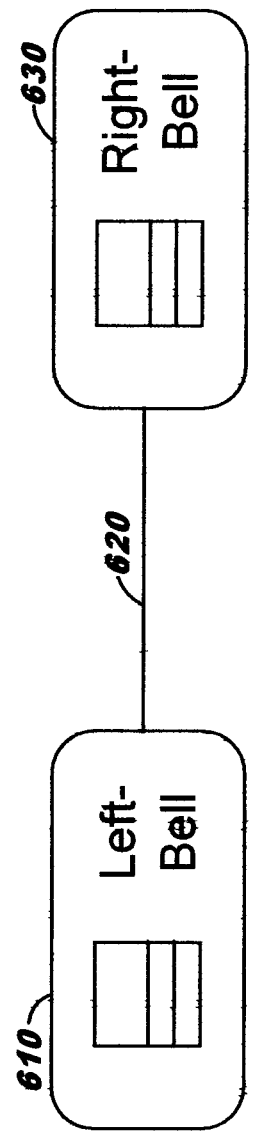

The barbell pattern is discussed herein as another example pattern, and comprises two roles and one relationship. Whereas the sample state pattern is illustrated herein as a macro pattern, the barbell pattern is illustrated as a micro pattern (in recognition that it may be deemed more useful as a building block than as a pattern of interest to an end user, although this characterization is by way of illustration and not of limitation). Referring now to FIG. 6, a graph 600 illustrates the barbell pattern, showing roles 610, 630 and a relationship 620 between them. The sample barbell pattern will now be discussed in more detail.

FIG. 7 illustrates a sample codification 700 of the barbell pattern. The "library" statement 701 specifies where this pattern codification will be stored (i.e., in the "example" library), and "use" statements 710 specify where to find other patterns used by this barbell pattern and in particular, where to find a class, association, and inequality pattern used by the barbell pattern. A "pattern" statement 720 provides a declaration of the barbell pattern, providing its name at 721 and specifying a "composites" attribute that identifies the class pattern 722, association pattern 723, and inequality pattern 724 which are used by this barbell pattern. In other words, the barbell pattern is defined in terms of (or composed from) the class, association, and inequality patterns.

A "structure" definition 730 provides the pattern signature for the barbell pattern, and in this example 700, the structure comprises two roles 740 and one relationship 750. These roles 740 and relationship 750 are as illustrated in FIG. 6, and comprise a "left-bell" role (see 610), a "right-bell" role (see 630), and a "bar" relationship (see 620). The "bar" relationship 750 in this example is between participants that assume the left-bell and right-bell roles 740, and thus the bar relationship definition specifies these role names as parameters in a parenthesized and comma-separated parameter list.

A "behavior" definition 760 specifies constraints on occurrences of barbell pattern 700. That is, the syntax specified at 770 must be in effect (i.e., must be true) for this barbell pattern to be applied. In particular, the syntax at 771 specifies that both the left-bell and right-bell participants must exhibit the class pattern; the syntax at 772 specifies that the "not-equals" relationship (which is presumably defined, in this example, in the "inequality" pattern referenced at 710 and 724) applies to participants assuming the role of left-bell and right-bell (i.e., a single participant cannot fill both roles simultaneously); and the syntax at 773 specifies that the "associates" relationship (which is presumably defined, in this example, in the "association" pattern referenced at 710 and 723) applies to the participants assuming the left-bell and right-bell roles. (As an alternative to the shorthand notation "left-bell, right-bell=class" shown at 771, this syntax may be expressed as "class(left-bell), class(right-bell)".)

Figure 8:
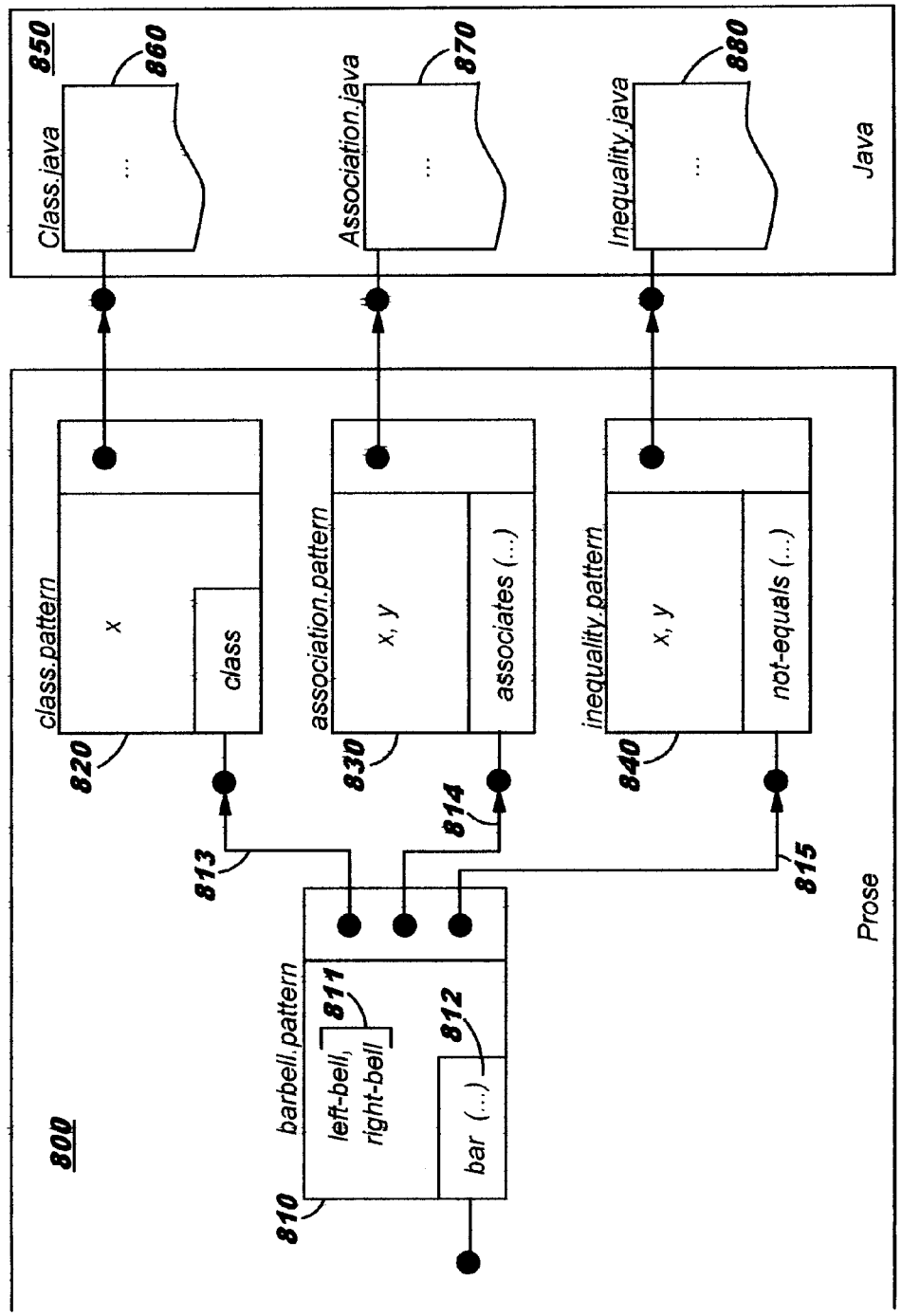
FIG. 8 illustrates a sample pattern composition with regard to the sample pattern from FIG. 6.

FIG. 8 shows an abstract graphical representation of composition of the barbell pattern, illustrating a representation of this pattern in the Prose language (see, generally, 800) as disclosed in the related application as well as an underlying implementation 850 in the Java programming language (by way of illustration but not of limitation) for the atomic patterns used by the barbell pattern. The barbell pattern itself is depicted abstractly at 810, showing the pattern's roles at 811 and relationship at 812. A set of pointers 813, 814, 815 point to graphical representations 820, 830, 840 of the three atomic patterns from which the barbell pattern is composed (as specified in the "pattern" statement at 720 of FIG. 7).

Referring to the graphical representation 820 of the class pattern, for this example, this pattern is shown in FIG. 8 as having a single role named "x" and a single relationship (which may be referred to as a property; see the discussion of reference number 950 of FIG. 9, below) which is named "class". The graphical representation 830 of the association pattern shows two roles named "x" and "y" and a single relationship named "associates", and the graphical representation 840 of the inequality pattern shows two roles named "x" and "y" and a single relationship named "not-equals". (This illustration also shows that the associates and not-equals relationships use a parameter list, as indicated in the sample codification at 770 of FIG. 7.)

For the barbell pattern example as described herein, patterns 820, 830, 840 are deemed to be atomic patterns, meaning that they cannot be further decomposed into other patterns. Accordingly, each of these atomic patterns is preferably implemented using code of an imperative programming language. FIG. 8 therefore shows a pointer from each of these atomic patterns to a corresponding Java programming language implementation thereof (References herein to use of the Java programming language, or more generally to use of an object-oriented language, are by way of illustration but not of limitation.) Thus, "Class.java" 860 provides code that implements the class pattern 820, "Association.java" 870 provides code that implements the association pattern 830, and "Inequality.java" 880 provides code that implements the inequality pattern 840. For example, "Inequality.java" 880 may be presumed to include code for evaluating the "not-equals" relationship between two participants that fulfill the "x" and "y" roles (see 840), thereby determining whether those participants are "not-equals" to each other.

FIG. 9 specifies a sample codification 900 of the class pattern in the Prose language disclosed in the related application. In the example, the class pattern is an atomic pattern that is referenced at 710 and 722 of FIG. 7 (and is shown abstractly at 820 in FIG. 8). As contrasted to the "pattern" statements 420 of FIGS. 4 and 720 of FIG. 7, note that the "pattern" statement 920 in codification 900 is prefixed with a "native" attribute (see 921) and does not specify a "composites" attribute. Accordingly, this statement 920 identifies an atomic pattern. A "structure" part 930 and "behavior" part 960 are specified for the atomic pattern, as in the macro-pattern definition in FIG. 4 and the micro-pattern definition in FIG. 7. The "structure" part 930 in this example 900 specifies a single role 940, having a name of "x" (as also depicted at 820 of FIG. 8), and a "properties" statement 950 defines "x" as being a class. Note that the syntax within the "structure" part 930 uses the keyword "properties", in contrast to "structure" part 730 of FIG. 7, which uses the keyword "relations". In the general case, a property is a "1-ary" relation. Because the atomic pattern 920 has only one role, this role may therefore be characterized using properties rather than relationships. A "behavior" definition 960 specifies operations 970 of this atomic pattern 900, and in this example, a single operation is defined. In this particular example, a wildcard "*" 972 is used as the condition for a "when" clause 971, indicating (in this example) that each iteration of this operation will invoke (see 973) the Java code identified at 974. As an alternative to use of the wildcard symbol "*" in a when clause, a particular pattern codification may specify other syntax, such as "when 'apply' invoke..." or "when 'detect' invoke..." to indicate conditions for invoking the recited operation. Multiple "when" statements may be specified in the behavior part of a particular pattern codification, such as both a "when 'apply'..." and a "when 'detect'...", thereby indicating that different underlying imperative code can be invoked under different conditions.

FIG. 10 provides sample Java code 1000 that may be invoked responsive to the when clause 971 of FIG. 9. In this example, the class pattern implements a single operation, which is shown through its implementation of the "Detectable" interface. If the participant bound to the "x" role in the "Class" pattern is of type UML class, then the invocation of code 1000 returns a value of "true".

The association pattern is an atomic pattern that is referenced at 710 and 723 of FIG. 7 (and is shown abstractly at 830 in FIG. 8). In one implementation, if the participants bound to the "x" and "y" roles in the association pattern are related to each other through a UML association, then the invocation of code underlying the association pattern returns a value of "true". Details of the codification and implementation of the association pattern are presented in the related application, and those details are not repeated herein.

FIG. 11 specifies a sample codification 1100 of the inequality pattern In the example, the inequality pattern is an atomic pattern that is referenced at 710 and 724 of FIG. 7 (and is shown abstractly at 840 in FIG. 8). The "pattern" statement 1120 is prefixed with a "native" attribute and does not specify a "composites" attribute, thereby indicating that this statement 1120 identifies an atomic pattern. A "structure" part 1130 and "behavior" part 1160 are specified, as in FIGS. 4, 7, and 9. The "structure" part 1130 in this example 1100 specifies two roles 1140, having names of "x" and "y" (as also depicted at 840 of FIG. 8), and a "relations" statement 1150 specifies a single relationship named "not-equals" between participants assuming these "x" and "y" roles. A "behavior" definition 1160 specifies operations 1170 of this atomic pattern 1100, and in this example, a single operation is defined. In this particular example, a wildcard "*" 1172 is used as the condition for a "when" clause 1171, indicating that each iteration of this operation will invoke (see 1173) the Java code identified at 1174. In one implementation of this invoked code (details of which are provided in the related application), if the participants bound to the "x" and "y" roles in the inequality pattern are not equal, then the invocation of the underlying code returns a value of "true".

Using pattern harvesting techniques disclosed herein, presence of patterns in a model can be detected in an automated manner, and these detected patterns can then be used for creating new patterns. Once a user or process has identified the boundary or scope of the candidate pattern occurrence, this is used as input to the harvesting process. The boundary might correspond to a Java package definition or a collection of UML diagrams, by way of example. The harvesting process of a preferred embodiment first performs an automated search to detect all existing pattern occurrences within the domain of model elements identified by the boundary marking action. See also the discussion of FIG. 13, below, which depicts logic which may be used when implementing the harvesting process. (The domain of model elements might comprise, by way of example, a model used for software architecture, design, and implementation; a model used in a requirements management or business process modeling tool; a data model used with audio or video applications; and so forth.) After these existing patterns are detected, the harvesting process determines all overlapping pattern occurrences. The term "overlapping pattern", as used herein, refers to pattern occurrences that share some or all of their respective pattern participants. That is, a pattern "A" overlaps a pattern "B" if a participant assuming a particular role "R1" in pattern "A" also assumes role "R2" in pattern "B". A concrete example of an overlapping pattern is discussed below with reference to the "overlapping barbell" pattern shown in FIG. 12.

Once the shared participants are determined, these participants are collapsed into a shared role for a new pattern as the pattern occurrence is generalized back to an abstract pattern specification. Non-shared participants are generalized up into the abstract pattern, each as a new non-shared role. Overlapping roles are constrained as such in the behavior section of the newly-codified, or harvested, pattern specification. It will be observed that a sufficient number of existing and recognizable pattern components should be present in the marked boundary, and that the larger the number of such pattern components, the better the results that may be achieved through harvesting.

When the harvesting process completes, there is immediately a new pattern ready for use. By performing the harvesting as disclosed herein, this process of creating a new pattern may be reduced to hours or even minutes, as contrasted to a manual, human-operated process of the prior art which may require days or even weeks. Depending on the level of detail available in the harvested pattern, a user may customize the pattern by editing the human-readable text of the Prose specification with a text editor; as another approach, a visual editor may be provided through which a user can edit the pattern specification. This customization may comprise refining undetected or improperly generalized semantics. As another example, the automated harvesting may result in variability points the user did not intend for the new pattern to include. In this case, the user has the option to keep certain pattern occurrences concrete, and when rolled-up into the pattern specification, restrict them from being generalized. Also, as yet another example, the harvesting may result in constituent patterns that are of no concern for the pattern creation at-hand. In this case, the harvested component pattern(s) can be selectively ignored when generating the harvested pattern specification.

Figure 12:
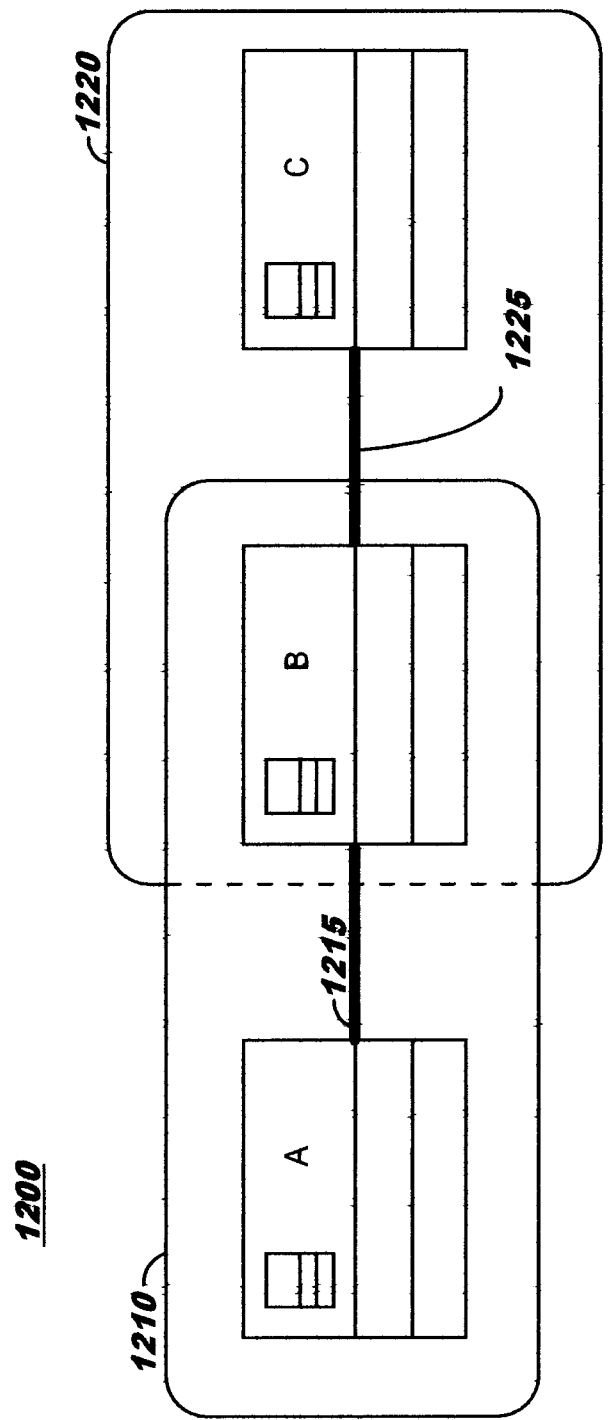
FIG. 12 shows an overlapping-barbell pattern, which may be harvested using an embodiment of the present invention.

FIG. 12 illustrates a pattern 1200 which is referred to herein as the "overlapping barbell" pattern. This pattern 1200 is used herein as an example of a pattern that will be harvested from a domain of model elements, and is composed of two overlapping occurrences 1210, 1220 of the barbell pattern illustrated at 600 of FIG. 6. That is, while a participant "A" assumes the role of left-bell and participant "B" assumes the role of right-bell in a first occurrence 1210 of the barbell pattern, this same participant "B" assumes the role of left-bell in a second occurrence 1220 of the barbell pattern while a different participant "C" assumes the role of right-bell in this second occurrence 1220. (It should also be noted that FIG. 12 may be considered as showing four occurrences of the barbell pattern, because the barbell pattern of the example is sensitive to the order in which the participants are assigned to the roles. Accordingly, occurrence 1210 is distinct from an occurrence where participant "B" assumes the role of left-bell and participant "A" assumes the role of right-bell, and similarly occurrence 1220 is distinct from an occurrence where participant "C" assumes the role of left-bell and participant "B" assumes the role of right-bell.)

FIG. 12 also illustrates an identifiable yet unnamed association 1215 between the participants in pattern 1210, and an identifiable yet unnamed association 1225 between the participants in pattern 1220. In this example, the association 1225 is depicted as a directed association connecting participant "C" to participant "B". A number of atomic pattern occurrences are also found within the scope of FIG. 12. There are three occurrences of the "class" pattern (one for each of the participants "A", "B", and "C"); the two association pattern occurrences shown at 1215, 1225; and multiple inequality pattern occurrences, indicating pair-wise inequality between each pair of pattern participants (indicating, for example, that participant "A" is not equal to participant "B" in pattern 1210, and that participant "B" is not equal to participant "C" in pattern 1220).

Figure 13:
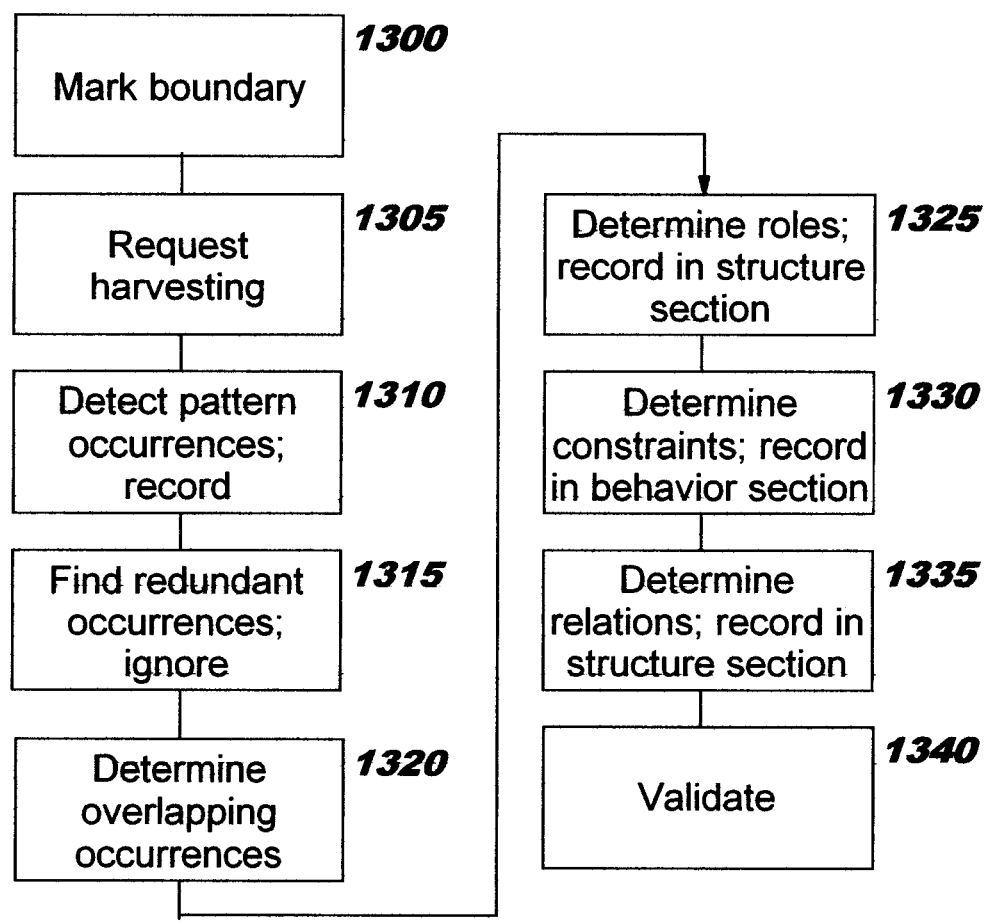
FIG. 13 provides a flowchart depicting logic which may be used when implementing an embodiment of the present invention.

A scenario using the overlapping barbell pattern with an implementation of the present invention will now be described with reference to the flowchart provided in FIG. 13. To harvest a new pattern, which the end user in the example desires to codify and to name "overlapping barbell", the user directs (Block 1300) a tool implementing the invention to the model elements represented in FIG. 12. This comprises identifying the domain from which the pattern is to be harvested, which is also referred to herein as defining or marking the boundary, and identifying at least one exemplar. It is assumed, for the example scenario, that the user sets three classes, their relationships, and their contents as the boundary/scope for the harvesting operation. (It is also assumed that the classes do not have any attributes or operations.) The user then instructs the tool (Block 1305) to harvest a new pattern—a pattern that specifies the abstraction hinted at by the concrete configuration of model elements exhibited within the marked boundary. The process then detects and records (Block 1310) pattern occurrences which are exhibited within this marked boundary. So, with reference to the model elements in FIG. 12, the two barbell pattern occurrences are detected and recorded, in addition to the three class pattern occurrences, the two association pattern occurrences, and the multiple inequality pattern occurrences.

Next, the process detects (Block 1315) that participant "A" is involved with a class pattern occurrence, an association pattern occurrence, and a barbell pattern occurrence. These pattern occurrences are therefore candidates for overlapping patterns, as they share some or all of their respective pattern participants. The process also determines (Block 1320) all overlapping pattern occurrences. For discussion purposes, the class, association, and barbell patterns are referred to as "C1", "A1", and "B1", respectively. The process realizes that C1 and A1 are component pattern occurrences comprising the B1 occurrence. Accordingly, the process recognizes that the occurrences C1 and A1 can be ignored in the definition of the new pattern specification because they would be redundant otherwise. (That is, occurrences C1 and A1 are already specified by the appearance of composite pattern occurrence B1.) As the process continues evaluating occurrences and removing redundant ones thereof, it eventually determines that there are three roles in the pattern being harvested. An embodiment of the present invention preferably provides an interface through which meaningful names can be assigned to the harvested pattern, its roles, and so forth. Suppose, for discussion purposes, that the tool presents a graphical user interface through which the user can assign names, and that the user in the example scenario names the three roles "left-bell", "middle-bell", and "right-bell".

FIG. 14 depicts a sample codification 1400 of the overlapping-barbell pattern, and illustrates output generated by the harvesting process disclosed herein. Preferably, the codification is recorded as a text file; as can be seen in FIG. 14, this codification is human-readable and expressed using the Prose language disclosed in the related application.

The "library" 1401 and "use" statements 1410 of codification 1400 are as discussed earlier with reference to manually-created patterns. The "pattern" statement 1420 provides a declaration of the overlapping-barbell pattern, providing its name at 1421 and specifying a "composites" attribute that identifies the barbell pattern 1423 and inequality pattern 1424 which are determined during harvesting as being used by this overlapping-barbell pattern. In other words, the overlapping-barbell pattern is defined in terms of (or composed from) the barbell and inequality patterns.

Overlapping roles are determined among the detected pattern occurrences. For example, a participant "P" may be detected as fulfilling a first role "R1" in an occurrence of the barbell pattern and as fulfilling a second role "R2" in an occurrence of an inequality pattern, and this overlap may be used in deducing information about the pattern being harvested. Preferably, overlapping roles are collapsed into a shared role for the new pattern as the pattern occurrence is generalized back to an abstract pattern specification. Accordingly, the determined roles are recorded (Block 1325) in the "structure" section of the pattern codification. See the structure definition 1430 in FIG. 14. The structure definition is programmatically created during the harvesting, with input from a user for assigning names as noted earlier, and provides the pattern signature for the overlapping-barbell pattern. In this example 1400, the three detected roles are specified in the "roles" portion 1440 of structure definition 1430.

The harvesting process determines constraints, and records those constraints in the behavior section of the codification of the overlapping-barbell pattern (Block 1330). In the example, the harvesting will determine that "left-bell", "middle-bell", and "right-bell" are constrained by the fact that the class pattern must exist on each of them. (That is, for any set of three domain elements which are proposed for fulfilling the roles "left-bell", "middle-bell", and "right-bell", each of the domain elements must exhibit the class pattern. If they do not, then this set of domain elements cannot exhibit the overlapping barbell pattern.) In addition, the harvesting process will determine that the association pattern must be exhibited between "left-bell" and "middle-bell", and it must also be exhibited between "middle-bell" and "right-bell". The harvesting process will also determine that "left-bell" and "right-bell" must together exhibit the inequality pattern. Other inequalities may be ignored since those become redundant by the barbell pattern.

Accordingly, "behavior" definition 1460 specifies constraints on occurrences of overlapping-barbell pattern 1400. That is, the syntax specified at 1470 must be in effect (i.e., must be true) for this overlapping-barbell pattern to be applied. In particular, the syntax at 1471 specifies that the "bar" relationship (which is defined, in this example, in the "relations" syntax 750 of FIG. 7) applies to a pair of participants assuming the role of left-bell and middle-bell; the syntax at 1472 specifies that the "bar" relationship also applies to a pair of participants assuming the role of middle-bell and right-bell; and the syntax at 1472 specifies that the "not-equals" relationship (which is presumably defined, in this example, in the "inequality" pattern referenced at 1424) applies to participants assuming the role of left-bell and right-bell (i.e., a single participant cannot fill both roles simultaneously).

Once the harvesting process accounts for all pattern occurrences in the new pattern specification and the roles have been determined, relations between the roles are inferred and recorded (Block 1335) in the "structure" section of the pattern codification. Relations are preferably inferred by looking at the component pattern occurrences and the behavioral constraints, and then deducing which relations must be present in the new pattern in order for the component occurrences to be completely bindable by real participants at instantiation time. Accordingly, in the example, the relation "overlaps" is specified in the "relations" portion 1450 of structure definition 1430 as a ternary relationship between the three roles 1440.

A normalization may be performed when determining the relations at Block 1335, whereby several overlapping pattern occurrences are collapsed into fewer pattern occurrences when the multiplicities defined by the component pattern allow this. For example, if the multiplicity for a given relation is one-to-many and the one is shared across pattern occurrences, then this can be collapsed into one occurrence since the one-to-many is still honored by this action. The multiplicities for each relation and additional role cardinalities are preferably set to the most constraining values that still describe the pattern occurrences represented within the marked boundary. (It is also possible that the normalization is performed earlier, at the time when pattern occurrences are detected.)

Lastly, the harvesting process preferably validates the candidate harvested pattern (Block 1340) by attempting to detect it in the same marked boundary which was set at Block 1300. The candidate pattern is valid if at least one pattern occurrence is detected within the marked boundary with the appropriate participants assuming the roles as set forth by the harvested pattern.

A user or process may optionally be allowed to further customize the harvested pattern (not shown in FIG. 13), as discussed earlier. In addition to assigning names, the customization may include other operations such as assigning properties. Or, as noted earlier, the user may wish to remove some level of detail from the pattern generated during the harvesting in order to introduce more variability into the pattern specification.

While the sample overlapping-barbell pattern used in describing operation of the present invention is relatively simple, there may be patterns which are quite complex and for which it would be difficult for a user to determine how to manually create a pattern codification.

Figure 15:
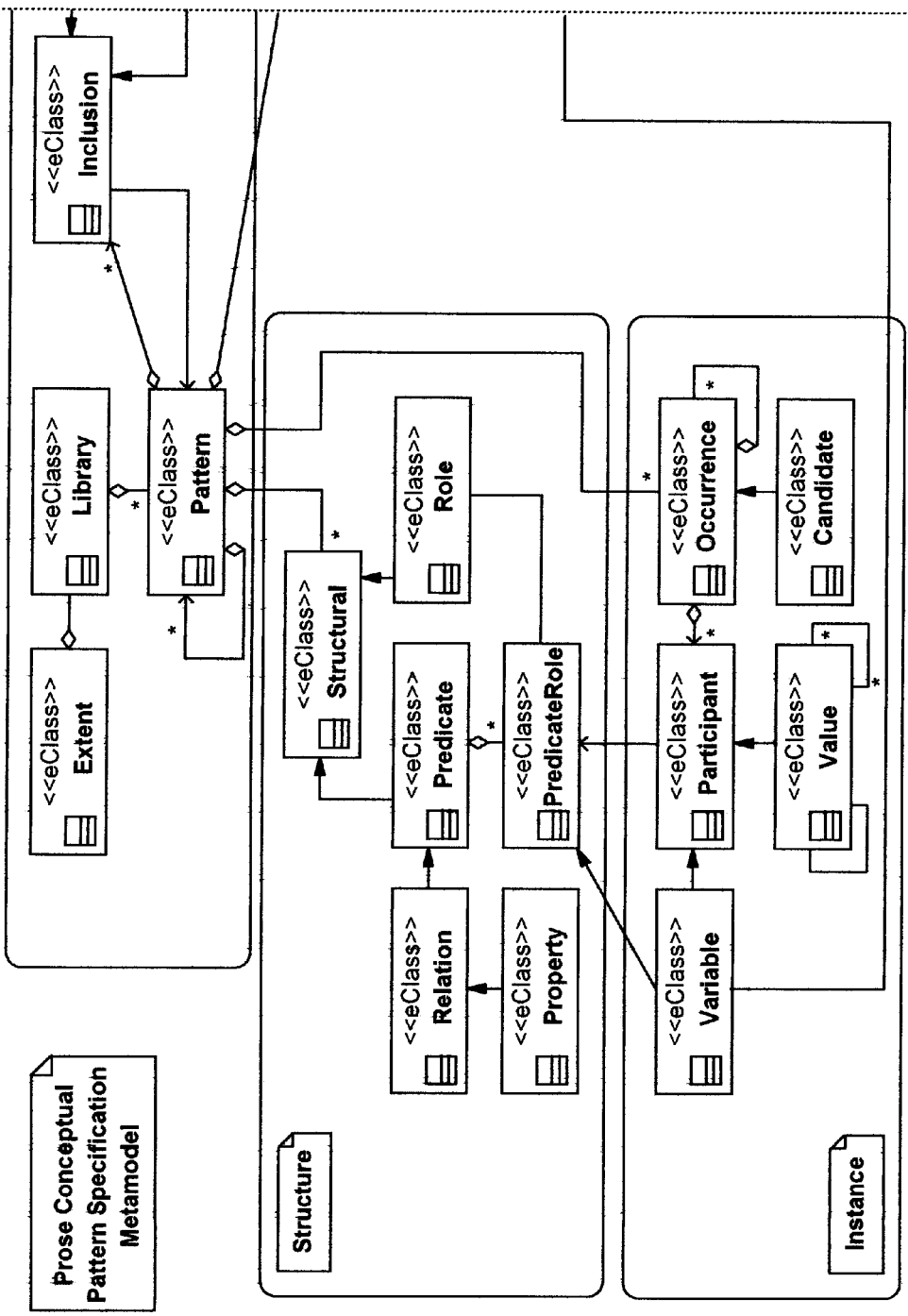
FIG. 15 illustrates a metamodel which may be used with an embodiment of the present invention.
Figure 15:
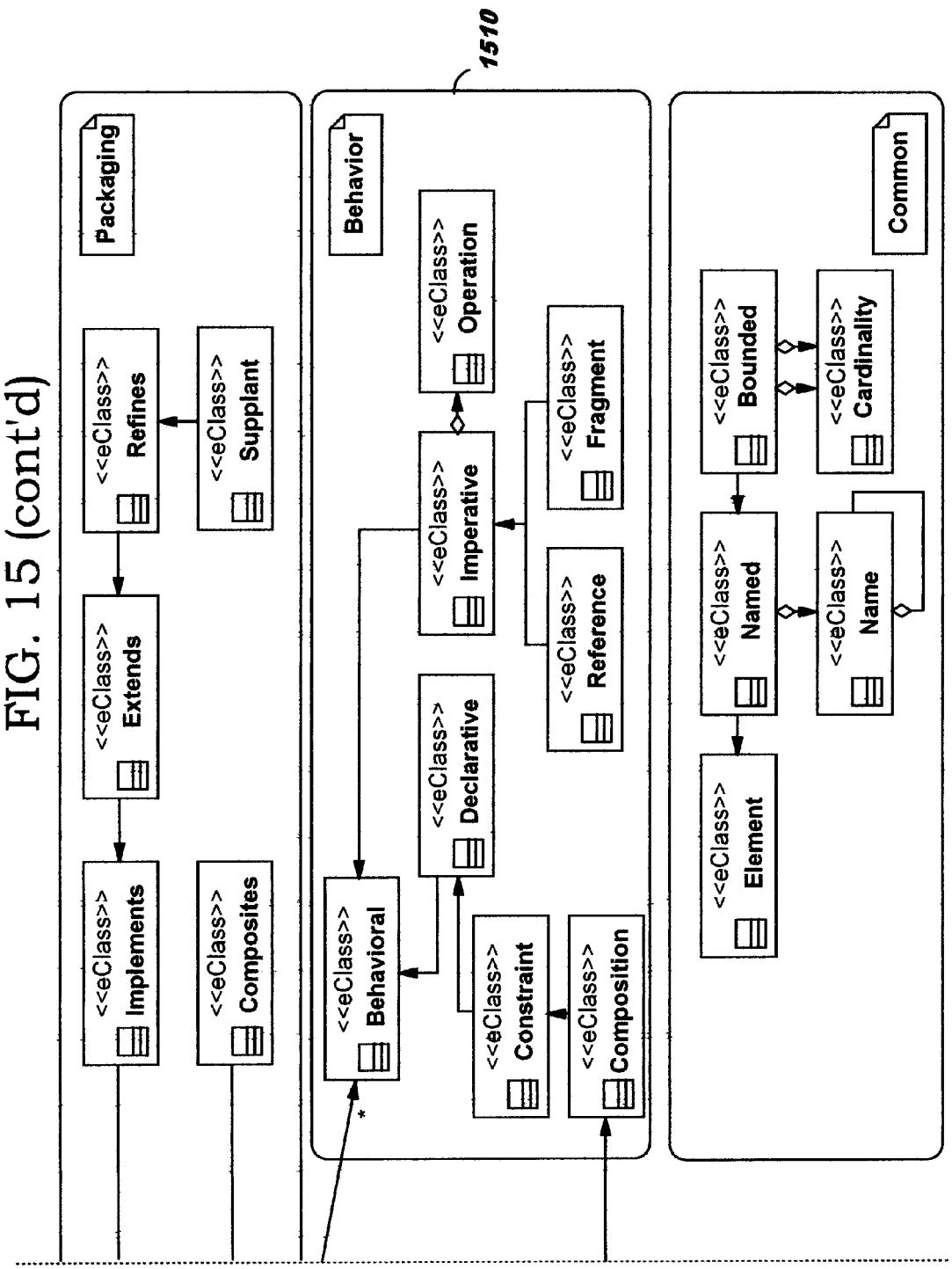

Patterns may be harvested from many different types of domains, as mentioned earlier. Patterns from audio or video data models might be harvested, for example, for music creation or video creation. As another example, spatial patterns of objects might be harvested for use in virtual worlds software. Patterns in documents might be harvested for document creation applications. A number of other scenarios may be envisaged. The harvesting may act upon software elements—such as object-oriented classes—through a metamodel or metamodels that describe the software elements and allow their manipulation. Referring now to FIG. 15, a pattern specification metamodel (or data model) which may be used with an embodiment of the present invention is illustrated therein using UML notation. UML notation is well known to those in the art, and a detailed description herein of FIG. 15 is therefore not deemed necessary.

An embodiment of the present invention may be deployed in an Eclipse environment, leveraging Eclipse plug-ins, and the metamodel of FIG. 15 may be defined using the Eclipse EMF Ecore metamodel. Eclipse is an open development platform from the Eclipse Foundation. Eclipse and EMF are well known in the art, and a detailed discussion thereof is not deemed necessary herein.

Referring now to FIG. 16A, an example 1600 of Java code that programmatically constructs two patterns, "pair" and "string", is depicted (where the "pair" pattern composites the "string" pattern, all in the same library, in this example). This sample code manipulates a pattern at the meta-model level, and may be used for detecting a pair of roles where string values are bound in a pattern occurrence to "left" and "right" roles; thus, the "pair" pattern may be harvested from a model having occurrences of the barbell pattern. FIG. 16B shows a sample meta-model pattern representation 1650, representing the same "pair" and "string" patterns using the Prose declarative pattern specification language disclosed herein. As can be seen from FIGS. 16A and 16B, the pattern representation at 1650 is more concise than the programmatically-created code 1600.

Figure 17:
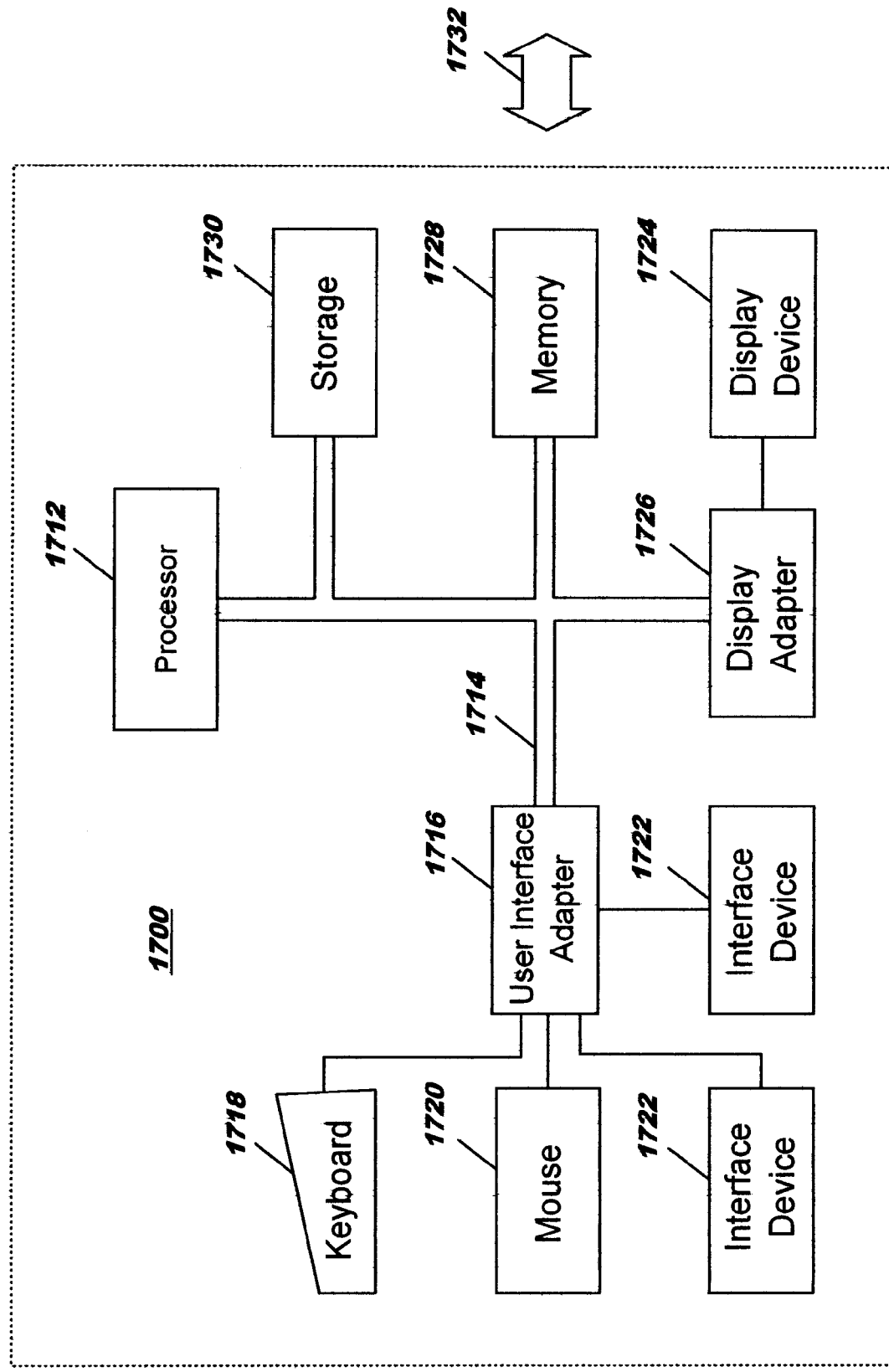
FIG. 17 depicts a data processing system suitable for storing and/or executing program code.

Referring now to FIG. 17, a data processing system 1700 suitable for storing and/or executing program code includes at least one processor 1712 coupled directly or indirectly to memory elements through a system bus 1714. The memory elements can include local memory 1728 employed during actual execution of the program code, bulk storage 1730, and cache memories (not shown) which provide temporary storage of at least some program code in order to reduce the number of times code must be retrieved from bulk storage during execution.

Input/output ("I/O") devices (including but not limited to keyboards 1718, displays 1724, pointing devices 1720, other interface devices 1722, etc.) can be coupled to the system either directly or through intervening I/O controllers or adapters (1716, 1726).

Network adapters may also be coupled to the system to enable the data processing system to become coupled to other data processing systems or remote printers or storage devices through intervening private or public networks (as shown generally at 1732). Modems, cable modem attachments, wireless adapters, and Ethernet cards are just a few of the currently-available types of network adapters.

Figure 18:
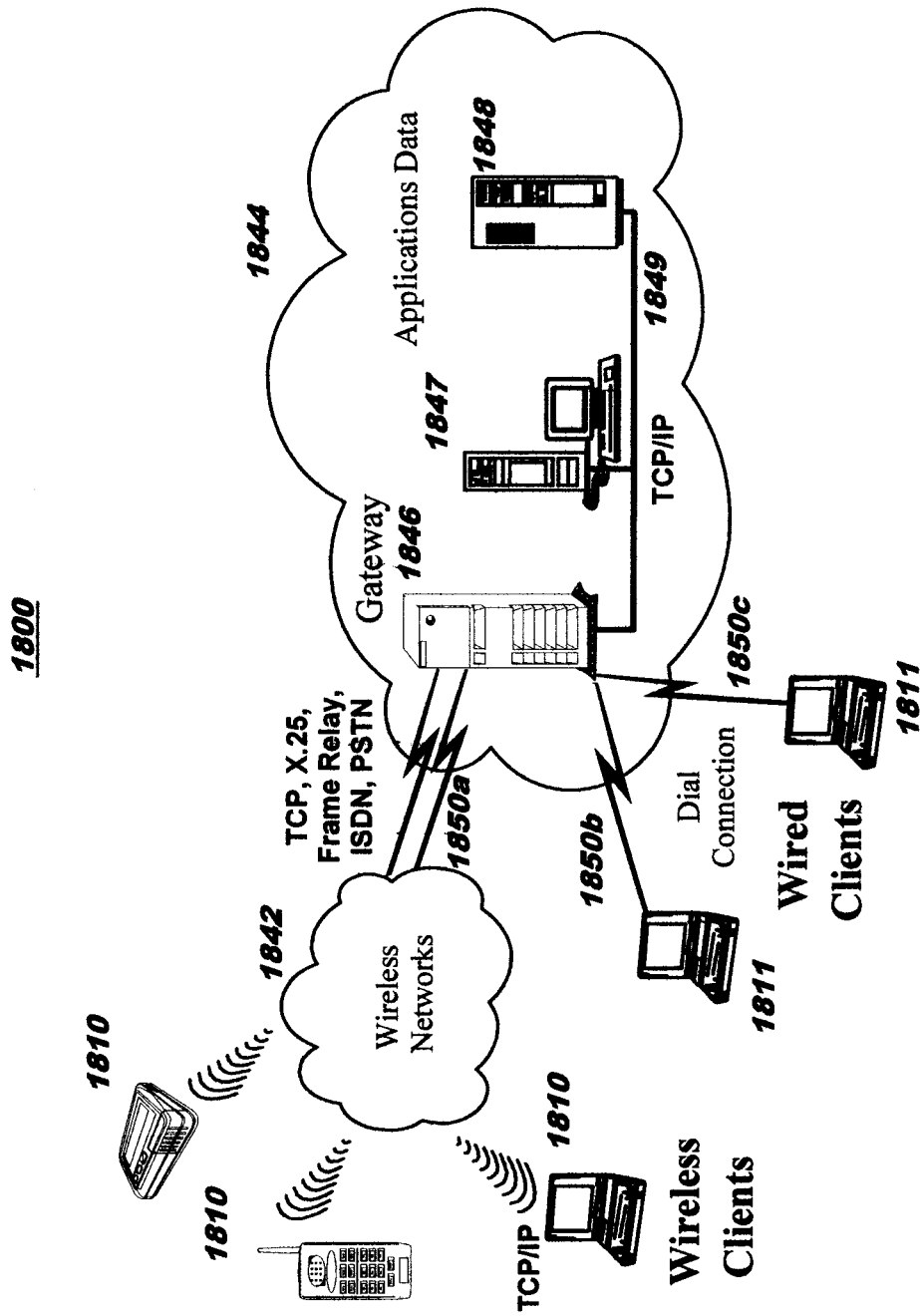
FIG. 18 depicts a representative networking environment in which one or more embodiments of the present invention may be used.

FIG. 18 illustrates a data processing network environment 1800 in which the present invention may be practiced. The data processing network 1800 may include a plurality of individual networks, such as wireless network 1842 and wired network 1844. A plurality of wireless devices 1810 may communicate over wireless network 1842, and a plurality of wired devices, shown in the figure (by way of illustration) as workstations 1811, may communicate over network 1844. Additionally, as those skilled in the art will appreciate, one or more local area networks ("LANs") may be included (not shown), where a LAN may comprise a plurality of devices coupled to a host processor.

Still referring to FIG. 18, the networks 1842 and 1844 may also include mainframe computers or servers, such as a gateway computer 1846 or application server 1847 (which may access a data repository 1848). A gateway computer 1846 serves as a point of entry into each network, such as network 1844. The gateway 1846 may be preferably coupled to another network 1842 by means of a communications link 1850a. The gateway 1846 may also be directly coupled to one or more player devices 1811 using a communications link 1850b, 1850c, and/or may be indirectly coupled to such devices. The gateway computer 1846 may be implemented utilizing an Enterprise Systems Architecture/390® computer available from IBM. Depending on the application, a midrange computer, such as an Application System/400® (also known as an AS/400®), iSeries®, System i™, and so forth may be employed. ("Enterprise Systems Architecture/390", "Application System/400", "AS/400", and "iSeries" are registered trademarks of IBM in the United States, other countries, or both, and "System i" is a trademark of IBM.)

The gateway computer 1846 may also be coupled 1849 to a storage device (such as data repository 1848).

Those skilled in the art will appreciate that the gateway computer 1846 may be located a great geographic distance from the network 1842, and similarly, the player devices 1810a, 1811a and/or other devices 1810b, 1811b may be located some distance from the networks 1842 and 1844, respectively. For example, the network 1842 may be located in California, while the gateway 1846 may be located in Texas, and one or more of the player devices 1810a may be located in Florida. The player devices 1810a may connect to the wireless network 1842 using a networking protocol such as the Transmission Control Protocol/Internet Protocol ("TCP/IP") over a number of alternative connection media, such as cellular phone, radio frequency networks, satellite networks, etc. The wireless network 1842 preferably connects to the gateway 1846 using a network connection 1850a such as TCP or User Datagram Protocol ("UDP") over IP, X.25, Frame Relay, Integrated Services Digital Network ("ISDN"), Public Switched Telephone Network ("PSTN"), etc. The player devices 1811a may connect directly to the gateway 1846 using dial connections 1850b or 1850c. Further, the wireless network 1842 and network 1844 may connect to one or more other networks (not shown), in an analogous manner to that depicted in FIG. 18.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including the declarative Prose language disclosed in the related application; an object oriented programming language such as Java, Smalltalk, C++, or the like; and conventional procedural programming languages such as the "C" programming language or similar programming languages. The program code may execute as a stand-alone software package, and may execute partly on the user's device and partly on a remote computer. The remote computer may be connected to the user's device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method of harvesting model-operative pattern representations, comprising using a processor of a computer to perform:

detecting, from an identified boundary of a model containing at least one identified pattern exemplar, all existing pattern occurrences;

determining, from the detected existing pattern occurrences, all overlapping pattern occurrences, wherein the overlapping pattern occurrences comprise first and second ones of the detected existing pattern occurrences that share at least one pattern participant; and generating, for each determined overlapping pattern occurrence, a new pattern to represent the determined overlapping pattern occurrence, comprising:

defining, for each role that shares at least one pattern participant in the first and second ones, a shared role in the new pattern and, for each pattern participant in the first and second ones that is not shared, a non-shared role in the new pattern;

generating a pattern codification for the new pattern, further comprising:

determining all shared and non-shared roles defined in the new pattern;

determining constraints of the new pattern;

determining relationships between the roles of the new pattern;

codifying the roles and the relationships of the new pattern in a structure section of the generated pattern codification; and codifying the constraints of the new pattern in a behavior section of the generated pattern codification for the new pattern; and recording the generated pattern codification for the new pattern on a storage medium.

2. The method according to claim 1, further comprising customizing, using an editor program, a textual specification generated as the codification of the new pattern.

3. The method according to claim 2, wherein the customizing further comprises assigning names to the new pattern and at least one role specified therein.

4. The method according to claim 1, further comprising validating the new pattern by attempting to detect the pattern in the identified boundary, the new pattern being validated if at least one pattern occurrence is detected, within the identified boundary, with appropriate participants assuming the roles of the new pattern.

5. The method according to claim 1, wherein:

the structure section specifies structural features of the new pattern, the structural features comprising the shared and non-shared roles defined in the new pattern and at least one relationship involving the role shared and non-shared roles; and the behavior section specifies behavioral features of the new pattern, the behavioral features comprising how to use the structural features in constraining structural features of other composited patterns from which the new pattern is composed or, when the new pattern is not composed of other composited patterns, an operation to invoke for implementing the new pattern.

6. The method according to claim 1, wherein each of the shared and non-shared roles and each relationship in the new pattern provides a point of variability for the new pattern, and these variability points enable reuse of the new pattern.

7. The method according to claim 1, further comprising:

determining redundant ones of the detected pattern occurrences; and removing the redundant occurrences before determining the overlapping occurrences.

8. The method according to claim 1, wherein the generated codification for the new pattern is specified separate from code for execution of the new pattern.

9. The method according to claim 1, further comprising:
  storing the generated pattern codification for the new pattern in a pattern library that stores pattern codifications for a plurality of patterns; and
  using the stored pattern codification for the new pattern as a component for compositing a different pattern.

10. A computer program product for building patterns as composites, the computer program product embodied on one or more non-transitory computer-readable storage media and comprising computer-readable program code for:
  detecting, from an identified boundary of a model containing at least one identified pattern exemplar, all existing pattern occurrences;
  determining, from the detected existing pattern occurrences, all overlapping pattern occurrences, wherein the overlapping pattern occurrences comprise first and second ones of the detected existing pattern occurrences that share at least one pattern participant; and
  generating, for each determined overlapping pattern occurrence, a new pattern to represent the determined overlapping pattern occurrence, comprising:
    defining, for each role that shares at least one pattern participant in the first and second ones, a shared role in the new pattern and, for each pattern participant in the first and second ones that is not shared, a non-shared role in the new pattern;
    generating a pattern codification for the new pattern, further comprising:
      determining all shared and non-shared roles defined in the new pattern;
      determining constraints of the new pattern;
      determining relationships between the roles of the new pattern;
      codifying the roles and the relationships of the new pattern in a structure section of the generated pattern codification; and
      codifying the constraints of the new pattern in a behavior section of the generated pattern codification for the new pattern; and
    recording the generated pattern codification for the new pattern on a storage medium.

11. A system for operational enablement of patterns, comprising:
  a computer comprising a processor device; and
  instructions which are executable, using the processor device, to implement functions comprising:
    detecting, from an identified boundary of a model containing at least one identified pattern exemplar, all existing pattern occurrences;
    determining, from the detected existing pattern occurrences, all overlapping pattern occurrences, wherein the overlapping pattern occurrences comprise first and second ones of the detected existing pattern occurrences that share at least one pattern participant; and
    generating, for each determined overlapping pattern occurrence, a new pattern to represent the determined overlapping pattern occurrence, comprising:
      defining, for each role that shares at least one pattern participant in the first and second ones, a shared role in the new pattern and, for each pattern participant in the first and second ones that is not shared, a non-shared role in the new pattern;
      generating a pattern codification for the new pattern, further comprising:
        determining all shared and non-shared roles defined in the new pattern;
        determining constraints of the new pattern;
        determining relationships between the roles of the new pattern;
        codifying the roles and the relationships of the new pattern in a structure section of the generated pattern codification; and
        codifying the constraints of the new pattern in a behavior section of the generated pattern codification for the new pattern; and
      recording the generated pattern codification for the new pattern on a storage medium.

\* \* \* \* \*